Patented Sept. 3, 1935

2,013,100

UNITED STATES PATENT OFFICE 2,013,100

AZO LAKE AND PIGMENT

Wayne N. Headley, Livingston, and Alfred Siegel, Hillside, N. J., assignors to Krebs Pigment & Color Corporation, Newark, N. J., a corporation of Delaware No Drawing. Original application October 16, 1933, Serial No. 693,826. Divided and this application August 2, 1934, Serial No. 738,048

3 Claims. (Cl. 134—58.5)

The present invention comprises novel azo lakes and pigments in which the azo coloring compound obtained by coupling diazotized 2-chloro-4-amino-toluene-5-sulfonic acid with 2-3-beta-hydroxy-naphthoic acid is combined with a substratum comprising liquid styrax.

Azo lakes and pigments are generally prepared by combining an azo coloring compound with a substratum which is commonly an inorganic, metallic oxide or hydroxide, such as aluminum hydroxide. It is also well known that resins derived from plants of the genus Gymnospermae, i. e. conifers, can be used to form substrata for azo pigments and lakes. (See for instance U. S. Patent Re-18,590 to E. R. Allen and A. Siegel, the latter being one of the inventors of the present improvement.) These resins, such as colophony, consist to a large and sometimes predominating extent of terpenic acids of which abietic acid is the most prominent one, as a matter of fact rosin or colophony consists of over 80% of abietic acid, and the property of rosin and rosinates to act as substrata for azo lakes and pigments was generally attributed to their content of abietic acid.

We have found that natural gums and balsams which are substantially free from terpenic acids and particularly free from abietic acid, can also act as substrata for azo lakes or pigments.

These natural gums and balsams are exudations of plants belonging to another genus than the conifers, they belong to the genus of Angiospermae: the gums and balsams from Angiospermae are composed of various organic acids, such as complex aromatic acids and other hydroxyl compounds or their derivatives, which can react with alkaline substances to form soaplike substances which, in the case of alkali metal soaps, are generally water soluble but less water soluble when the base of the soap is an alkaline earth or heavy metal.

Among the natural gums and waxes derived from Angiospermae, which are useful in our invention, we may cite the following: liquid styrax, storax, etc., these are balsams contained particularly in the wood and inner bark of *Liquidambar orient,* and other Hammanelidiaceae, of the order of Saxifraginae and genus Angiospermae.

The use of these natural gums and balsams as substrata according to our invention involves the formation of water soluble soaps therefrom, as for instance by the action of caustic alkalies thereon, and a subsequent precipitation or partial precipitation of an alkaline earth metal or heavy metal soap.

The process of our invention comprises heating, for instance, to the boiling temperature an aqueous suspension of an insoluble azo coloring compound or salt in the presence of a substantial amount of an insoluble or partially soluble soap of liquid styrax.

This heating results in the development of a lake or pigment whereby the azo compound combines in physical or chemical manner with the soap and other changes take place in the azo compound and the full tinctorial values of the lake in respect to improved shade and strength are obtained.

The suspension of the insoluble azo coloring compound and soap of the natural gums and balsams can be prepared in any desired manner.

We can, for instance, add a soluble alkali metal gum or balsam soap to either the diazo compound or to the coupling compound, effect the formation of the azo coloring compound and then add an alkaline earth or heavy metal salt to the reaction mixture whereby the insoluble azo compound and the insoluble soap are precipitated. The so-obtained suspension can then be directly heated to develop the lake, or we can purify the mixture by separating it from the mother liquor and forming a new aqueous slurry therefrom. We can also prepare separately the more or less water soluble azo coloring compound and add the soluble soap thereto, jointly precipitate the two and then develop or we can prepare separately the insoluble azo compound and the insoluble soap, form an aqueous slurry therefrom and then develop or we can prepare the aqueous suspension of the two insoluble reactants in any other manner as will be obvious to any one skilled in this art.

The insoluble azo coloring salts are prepared in the same manner as the insoluble gum and balsam soaps, namely by acting upon the more or less soluble alkali metal salts of the azo compounds with salts of the alkaline earth and heavy metals such as calcium, barium, aluminum, zinc, lead, etc. We can also use azo compounds which are obtained directly in insoluble form in the coupling reaction.

The development can be carried out in a neutral or alkaline medium, similar results being obtained, though in many instances we prefer to develop in an alkaline medium. It is also in many instances preferred to add a dispersing agent to the development mixture and for this purpose we found the following quite useful:

soluble fatty acid soaps, sulfonated vegetable and animal oils, such as Turkey red oil, sulfonated castor oil, sulfonated cotton seed oil, sulfonated fish oil, etc.

Our novel lakes and pigments are characterized chemically by containing as the substratum an insoluble soap of liquid styrax. These novel lakes have brighter and cleaner shades and improved tinctorial properties when compared with the corresponding lakes made with inorganic substrata.

The following is an example of one of our novel lakes and pigments and how it was prepared.

It will be understood that our invention is not limited to the specific manipulations described in this example, particularly as referred to the production of the azo compound and its treatment before development, and that other metal salts can be used to produce the insoluble azo compound and insoluble soap of liquid styrax.

*Example.*—A solution of the sodium salt of 2-chloro 4-amino toluene 5-sulfonic acid corresponding to 44.4 parts of the free acid is diazotized in the usual manner with 15 parts of sodium nitrite and 57 parts of hydrochloric acid 20° Bé. In a separate container 40 parts of 2-3-hydroxy naphthoic acid and 12.3 parts of caustic soda are added to 350 parts of water and dissolved; to this is added a solution of 24 parts of soda ash in 150 parts of water and the volume of 2-3-hydroxy naphthoic acid solution is adjusted to 1200 parts at 15° C. The diazo solution mentioned above is then introduced and the coupling proceeds rapidly and to good completion. After stirring one hour the dyestuff is heated to 65° C. in 15 minutes and held at 65° C. for 15 minutes. It is then filtered and re-slurried to 9200 parts at 40° C.

To a solution of 11.5 parts of caustic soda and 200 parts of water is added 30 parts of liquid styrax, and the preparation boiled to complete saponification. This preparation is then run into the dye suspension described above, stirred, and 10.4 parts of acetic acid added.

The charge is then heated to the boil in 20 to 30 minutes, boiled 5 minutes, and precipitated with a solution of 120 parts of calcium chloride in 1200 parts of boiling water. After boiling to insure development, the product is washed, filtered, dried and ground in the usual manner.

The yield is approximately 99 parts of pigment compared with 90 parts in a charge carried out in exactly the same way but without the liquid styrax. The lake pigment contains about 9% of the calcium salt of liquid styrax as an insoluble substratum. The lake is equal in strength to the normal product, and when ground into litho varnish gives a cleaner, brighter, yellower printing tone.

This application is a division of our application Ser. No. 693,826, filed Oct. 16, 1933 for azo coloring materials comprising an azo compound and natural gums and balsams as a substratum.

We claim:

1. A lake or pigment comprising an insoluble salt of the azo compound obtained by coupling diazotized 2-chloro 4-amino toluene 5-sulfonic acid with 2-3-hydroxy naphthoic acid, combined with a substratum comprising a soap of liquid styrax.

2. A lake or pigment comprising an alkaline earth metal salt of the azo compound obtained by coupling diazotized 2-chloro 4-amino toluene 5-sulfonic acid with 2-3-hydroxy naphthoic acid, combined with a substratum comprising an alkaline earth metal soap of liquid styrax.

3. A lake or pigment comprising the calcium salt of the azo compound obtained by coupling diazotized 2-chloro 4-amino toluene 5-sulfonic acid with 2-3-hydroxy naphthoic acid, combined with the calcium soap of liquid styrax as a substratum.

WAYNE N. HEADLEY.
ALFRED SIEGEL.